United States Patent
Jain et al.

(10) Patent No.: US 9,917,441 B2
(45) Date of Patent: *Mar. 13, 2018

(54) INTELLIGENT GRID COMMUNICATIONS NETWORK MANAGEMENT SYSTEMS AND METHODS

(71) Applicant: Accenture Global Services Limited, Dublin (IE)

(72) Inventors: Rahul Jain, Mableton, GA (US); Leslie T. Turkson, Springfield, VA (US); Vaibhav J. Parmar, Raleigh, NC (US); Shahid Ahmed, Chicago, IL (US)

(73) Assignee: Accenture Global Services Limited, Dublin (IE)

( * ) Notice: Subject to any disclaimer, the term of this patent is extended or adjusted under 35 U.S.C. 154(b) by 467 days.

This patent is subject to a terminal disclaimer.

(21) Appl. No.: 14/630,118

(22) Filed: Feb. 24, 2015

(65) Prior Publication Data

US 2015/0171629 A1 Jun. 18, 2015

Related U.S. Application Data

(62) Division of application No. 13/111,654, filed on May 19, 2011, now Pat. No. 9,009,002.

(51) Int. Cl.
*G06F 11/30* (2006.01)
*H02J 3/00* (2006.01)
(Continued)

(52) U.S. Cl.
CPC ............... *H02J 3/00* (2013.01); *G05B 15/02* (2013.01); *G06Q 10/10* (2013.01); *G06Q 50/06* (2013.01);
(Continued)

(58) Field of Classification Search
CPC ............ H04L 12/2825; G05B 23/0221; G05B 23/0254; G06F 11/079
(Continued)

(56) References Cited

U.S. PATENT DOCUMENTS

| 4,781,119 A | 11/1988 | Davis |
| 5,735,492 A | 4/1998 | Pace |

(Continued)

FOREIGN PATENT DOCUMENTS

| CN | 101741144 A | 6/2010 |
| CN | 201797601 U | 4/2011 |

(Continued)

OTHER PUBLICATIONS

Examiner's First Report on Patent Applicatino No. AU 2011253619, dated Jan. 16, 2012, pp. 1-3, IP Australia, Woden ACT, Australia.

(Continued)

Primary Examiner — Toan Le
Assistant Examiner — Xiuqin Sun
(74) Attorney, Agent, or Firm — Brinks Gilson & Lione

(57) ABSTRACT

A system for communication network management of a utility grid includes a database configured to store a grid information data set, where the grid information data set includes network device information for the utility grid and a network management system executable by a processor to: receive an event message from one or more network devices indicative of one or more failures in a communication network of the utility grid; retrieve the grid information data set; identify one or more network device associated with the one or more failures based on the grid information data set; transmit a request for a response to the identified one or more network devices; determine a response pattern based on responses from the identified one or more network
(Continued)

devices in order to identify a cause of the failure based on the response pattern.

20 Claims, 6 Drawing Sheets

(51) Int. Cl.
| | | |
|---|---|---|
| *H04L 12/24* | (2006.01) | |
| *H04L 12/26* | (2006.01) | |
| *G05B 15/02* | (2006.01) | |
| *G06Q 10/10* | (2012.01) | |
| *G06Q 50/06* | (2012.01) | |
| *H04L 29/08* | (2006.01) | |

(52) U.S. Cl.
CPC ........ *H04L 41/065* (2013.01); *H04L 41/0645* (2013.01); *H04L 43/0811* (2013.01); *H04L 67/10* (2013.01); *H04L 43/10* (2013.01); *Y04S 40/166* (2013.01); *Y04S 40/168* (2013.01)

(58) Field of Classification Search
USPC ........................................................ 702/185
See application file for complete search history.

(56) References Cited

U.S. PATENT DOCUMENTS

| | | | |
|---|---|---|---|
| 6,104,978 A | 8/2000 | Harrison et al. | |
| 6,857,020 B1* | 2/2005 | Chaar .................... | G06Q 10/10 709/223 |
| 6,860,453 B2 | 3/2005 | Moretti et al. | |
| 6,925,366 B2 | 8/2005 | Theurer et al. | |
| 6,985,803 B2 | 1/2006 | Abdel-Malek et al. | |
| 7,213,789 B1 | 5/2007 | Matzan | |
| 7,239,238 B2 | 7/2007 | Tester et al. | |
| 9,009,002 B2* | 4/2015 | Jain .................... | H04L 41/0645 702/185 |
| 2002/0116544 A1* | 8/2002 | Barnard .............. | H04L 12/2805 719/324 |
| 2004/0225927 A1 | 11/2004 | Warpenburg et al. | |
| 2006/0261218 A1 | 11/2006 | Mace et al. | |
| 2007/0152107 A1 | 7/2007 | LeFebvre et al. | |
| 2009/0173840 A1 | 7/2009 | Brown et al. | |
| 2012/0296607 A1 | 11/2012 | Jain et al. | |
| 2013/0132555 A1 | 5/2013 | Wang et al. | |
| 2013/0204452 A1* | 8/2013 | Yamaguchi .............. | H04B 3/54 700/292 |

FOREIGN PATENT DOCUMENTS

| | | |
|---|---|---|
| WO | WO 02/060124 A2 | 8/2002 |
| WO | WO 2004/040731 A1 | 5/2004 |
| WO | WO 2011/027195 A1 | 3/2011 |

OTHER PUBLICATIONS

International Search Report and Written Opinion of the International Searching Authority, dated Aug. 176, 2013, pp. 1-9, issued in International Application No. PCT/US2012/036930, European Patent Office, Rijswijk, The Netherlands.

McArthur, S., "Challenges in Delivering the Smart Grid," IEEE International Symposium on Power Line Communications and its Applications, Apr. 3-6, 2011, pp. 1-22, Udine, Italy.

Taylor, T., Ohrn, M., "Network Management for Smart Grids," ABB Review, Mar. 2009, pp. 45-49.

Australian Examination Report, dated Jun. 16, 2014, pp. 1-2, issued in Australian Patent Application No. 2013245544, IP Australia, Woden ACT, Australia.

\* cited by examiner

| Number | Steps | Step Type | Purpose | Result (Status) |
|---|---|---|---|---|
| 1 | Establish relationship | Correlation | Correlate events based on the common impact to the service | |
| 2 | Ping a set of meters | RCA (Root Cause Analysis) | Check availability of meters whose meter reads are missing | PASS |
| 3 | Availability of the collector | RCA | Check availability of the collector in the field. Send "up" requests to the collector. Try at most 3 times before deciding the status of the collector. | FAIL |
| 4 | Availability of the Head End system | RCA | Check availability of the Head End system | PASS |
| 5 | Connectivity between Meters and Collector | RCA | Check the connectivity between meters and collector | PASS |
| 6 | Connectivity between Collector and the Head End System | RCA | Check the connectivity between field collector and the Head End System | PASS |
| 7 | Connectivity between Head End system and Enterprise Applications | RCA | Check the connectivity between the Head End system and enterprise applications | PASS |

| Number | Purpose | Step Type | Purpose | Result (Status) |
|---|---|---|---|---|
| 1 | Establish relationship | Correlation | Correlate events based on the common impact to the service | |
| 2 | Ping a set of meters | RCA (Root Cause Analysis) | Check availability of meters whose meter reads are missing | PASS |
| 3 | Availability of collector | RCA | Check availability of collector in the field | PASS |
| 4 | Availability of Head End System | RCA | Check availability of the Head End system | PASS |
| 5 | Connectivity between Meters and Collector | RCA | Check the connectivity between meters and collector (basically availability of the backhaul network) | FAIL |
| 6 | Connectivity between Collector and Head End System | RCA | Check the connectivity between field collector and the Head End System | PASS |
| 7 | Connectivity between Head End system and Enterprise Applications | RCA | Check the connectivity between the Head End system and enterprise applications | PASS |
| 8 | Ping cell tower 1 | RCA (Root Cause Analysis) | Check availability of cell tower 1 | PASS |
| 9 | Ping cell tower 2 | RCA | Check availability of cell tower 2 | PASS |
| 10 | Ping cell tower 3 | RCA | Check availability of cell tower 3 | FAIL |
| 11 | Ping network router1 | RCA | Check the availability of network router1 | PASS |
| 12 | Ping network router2 | RCA | Check the availability of network router2 | PASS |
| 13 | Ping network router3 | RCA | Check the availability of network route3 | PASS |

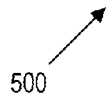

INTELLIGENT GRID COMMUNICATIONS NETWORK MANAGEMENT SYSTEMS AND METHODS

This application is a divisional application of U.S. patent application Ser. No. 13/111,654, filed on May 19, 2011. The entirety of U.S. patent application Ser. No. 13/111,654 is incorporated by reference herein.

BACKGROUND

1. Field of the Invention

The present invention relates generally to a system and method for managing communication networks, and more particularly to a system and method for managing communication network issues in an intelligent utility grid system.

2. Related Art

As utilities deploy and operate smart grids, they face the prospect of making substantial investments in new technologies and devices without certainty regarding the levels of return and business benefits. However, a well-informed and closely-targeted application of analytics is beneficial to the financial and operational success of smart grid deployments.

For utilities implementing smart grids, the prime opportunity presented by analytics is to make smarter, faster decisions based on timely and accurate interpretation of smart grid data. Once utilities implement a smart grid, they will immediately face a deluge of grid data generated by a vast array of sensors and devices. The resulting flow of information may inundate the workforce of a utility, leading to a potential failure to analyze the volumes of raw data.

BRIEF SUMMARY

According to one aspect of the disclosure, a system for communication network management of a utility grid may include a database configured to store a grid information data set, where the grid information data set includes network device information for the utility grid. The communication network management system may further include a network management system executable by a processor to perform a number of functions. The processor may be executable to receive an event message from one or more network devices indicative of one or more failures in a communication network of the utility grid. The processor may further be executable to retrieve the grid information data set. The processor may be further executable to identify one or more network devices associated with the failure based on the grid information data set. The processor may be further executable to transmit a request for a response to the identified one or more network devices. The processor may be further executable to determine a response pattern based on responses from the identified one or more network devices in order to identify a cause of the failure based on the response pattern. The identified cause may further be based on the event message.

According to at least a second aspect, the system may include a fault, performance, and configuration management (FPCM) module executable by the processor to communicate directly with each network device along a communication path of the communication network and to determine the cause of the failure based on the response patterns and event messages from respective network devices. The FPCM module may further include a plurality of application program interfaces (APIs) that facilitate communication of the FPCM directly with respective network devices. The FPCM may further include a library access module used to retrieve the grid information data set from the database specific to the identified network devices.

According to at least a third aspect, the system may include an incident management module executable by the processor to generate a single trouble ticket based on a plurality of causes of failure associated with a single network device.

According to at least a fourth aspect, the system may include a service level management module executable by the processor to report penalties that ensure accounting of owned service credits beyond contractual usage levels and to provide power against contractual service level obligations.

According to another aspect of the disclosure, a method for managing a communication network of a utility grid may be executed by a computer have a processor and memory and may include receiving an event message from one or more network devices indicative of one or more failures in a communication network of the utility grid. The method may further include retrieving a grid information data set from a database where the grid information data set includes network device information for the utility grid. The method may further include identifying one or more network devices associated with the one or more failures based on the grid information data set. The method may further include transmitting a request for a response to the identified one or more network devices. The method may further include determining a response pattern based on responses from the identified one or more network devices in order to identify a cause of the failure based on the response pattern.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

Like numerals may correspond to like structures or features as explained herein throughout the various views of the drawings.

FIG. 4 is a table of an example operation of a fault, performance, and configuration management module.

FIG. 5 is a table of another example operation of the fault, performance, and configuration management module.

DETAILED DESCRIPTION

The present disclosure is drawn to a system and methods for communication network management of a utility grid. Utilities that implement analytical software tools and processes will be able to transform volumes of raw data into useful, comprehensible information for business decision making Real-time decisions critical to the health or stability of a utility grid may mean the difference between success and failure for reasons that will be discussed.

Figure 1:
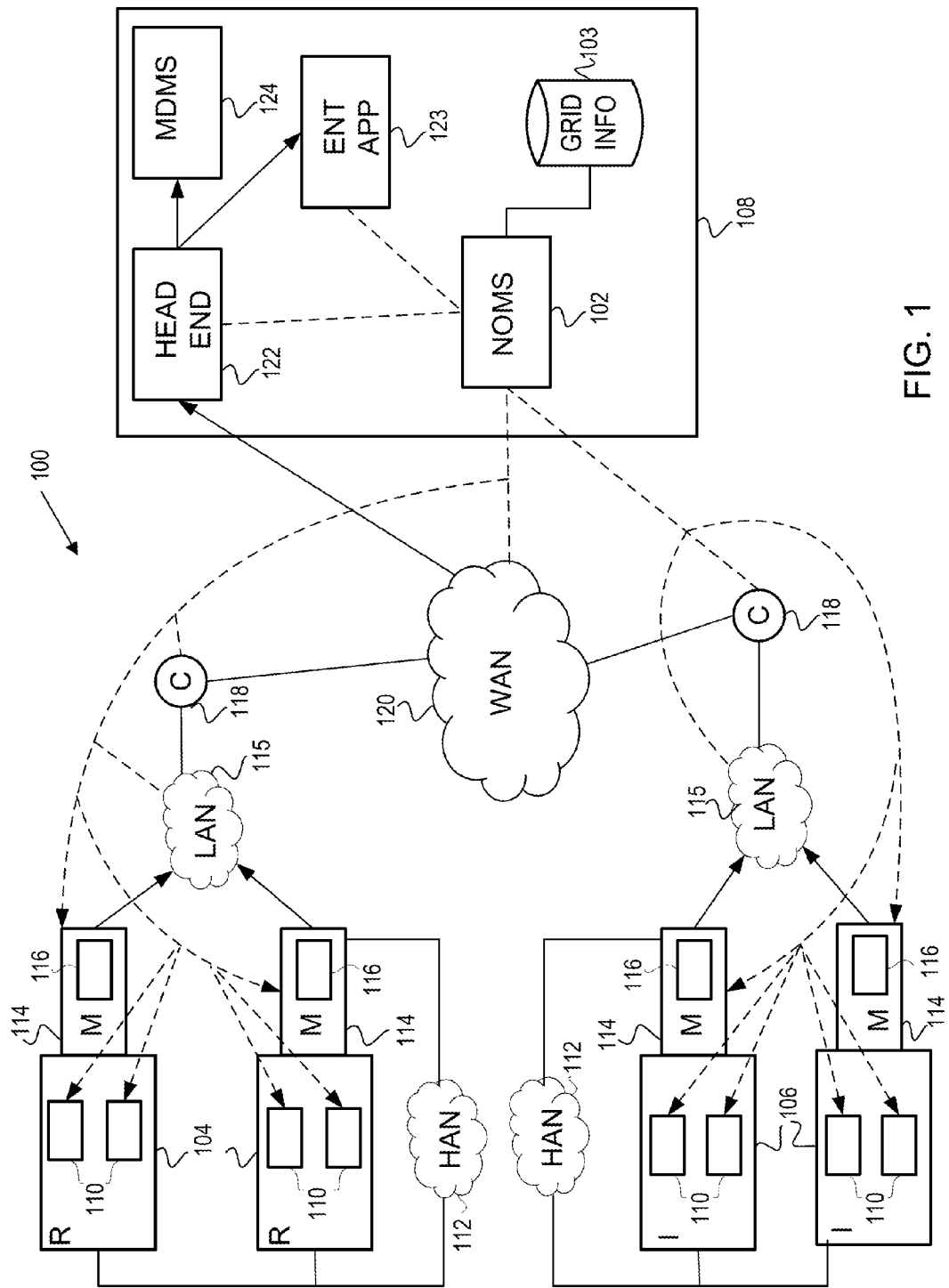
FIG. 1 is a block diagram of an example Smart Grid communication network system.

FIG. 1 is a diagram of an example of an intelligent utility grid, or "Smart Grid" 100 having an integrated network operations and management system (NOMS) 102. The NOMS 102 may include or be coupled with a database 103 configured to store a grid information data set that includes network device information for the Smart Grid 100. Herein, the phrase "coupled with" is defined to mean directly connected to or indirectly connected through one or more intermediate components. The terms "intelligent utility grid" or "Smart Grid" may include utility equipment used to supply the particular service or good as well as all equipment used to control, manage, observe, and operate the equipment. Such Smart Grids may include centralized, distributed, or some combination thereof to perform such supervisory and administrative actions. In one example, the Smart Grid 100 may be used in an electric utility system. The electric utility system may serve particular geographic territories including various residential customers ("R") 104 and industrial/commercial customers ("I") 106.

Smart Grid implementation allows the use of intelligent network devices to monitor, report, and control power usage of customers. Use of the intelligent network devices allows real-time information regarding power consumption to be relayed to a control center 108 of the Smart Grid. The control center 108 may represent a centralized control center of the Smart Grid 100 where a topology of the electrical equipment in the Smart Grid 100—switches, relays, substations, power plants—may be monitored and controlled through use of the intelligent network devices. Access to the information provided by the intelligent network devices may be distributed such that the grid information data sent may be readily available through various types of network configurations.

In one example, some or all of the customers may include end devices 110 configured to monitor and control various customer devices. The powered devices may be remotely controlled by a utility company through communication with the end devices 110 allowing terms of a power usage agreement to be observed, for example. Each of the end devices 110 may communicate over or through a home area network ("HAN") 112 also referred to as a customer network 112. The Smart Grid 100 may include a customer network 112 for one or more residential customers 104 and a customer network 112 for one or more commercial customers 106. The HAN 112 may include typical networking equipment to and between switches and routers, including wireless capability, or may be a hard-wired connection depending on the geographic setup and connection demands of the premises.

Accordingly, the HAN or customer network 112 may function primarily to provide connectivity between end devices 110 and corresponding dedicated meters ("M") 114 to which the end devices 110 provide real-time power usage information. In one example, each customer may include a dedicated customer network 112 used to allow two-way communication with the dedicated meter 114. Each meter 114 may determine the total power usage for a respective customer based on information provided by the corresponding end devices 110 or through other conventional power monitoring means.

Each of the meters 114 may communicate with the control center 108 to relay power usage information as well as to receive commands from the control center 108. In one example, each of the meters 114 may include a telemetry interface unit (TIU) 116, which is a device that may include a processor and memory and be responsible for transmitting and receiving meter data. Alternatively, the TIU 116 may be a stand-alone device that communicates with a respective meter 114.

Meters 114 may be associated with one or more local area networks (LANs) 115 used by the meters 114 to communicate within the Smart Grid 110, such as with the control center 108. In one example, each LAN 115 may include various types of networking equipment such as network switches, routers, microwave and cellular towers, for example. Each of the meters 114 may relay meter data to a respective collector 118. Each collector 118 may be an intelligent device including a processor, memory, and communication equipment that receives meter data for a number of meters 114. Each collector 118 may communicate to the control center 108 or other areas of the Smart Grid 100 using a wide area network (WAN) 120. In one example, each WAN 120 may provide communication capability through cellular communication towers, microwave towers, network switches, routers, or other communication devices, protocols, and strategies used for long-range communications.

Each WAN 120 may provide meter data received from the collectors 118 to a control center interface 122, also known as a "head end" 122. The head end 122 may provide the meter data to enterprise applications 123 such as an outage management system (OMS) and a demand response management system (DRMS). The head end 122 may also provide the meter data to a meter data management system (MDMS) 124, which may include a central repository for storing meter data so that it may be accessed within the Smart Grid 100 for subsequent use and analysis, such as for customer billing purposes, for example.

Use of such intelligent devices for monitoring and controlling customer power consumption includes various challenges. The relaying of power usage information between the end devices 110 and the control center 108 may be wireless, hardwired, or a combination of both. Use of wireless communication may pose difficulties, however. For example, each dedicated customer network 112 may rely on wireless communication between end devices 110 and the meters 114. The meters 114 may be physically positioned in such a way as to make accessibility difficult. Similarly, the collectors 118 may communicate wirelessly with the meters 114, which may be challenging if the meters 114 are physically positioned in a manner that hinders optimal wireless communication. Communicating with multiple meters may pose challenges for the collectors 118 including: availability of the network 115 between meter 114 and collector 118 that may impact the availability of the meter data; amount of data transferred from meters 114 to collectors 118; and availability of the collectors 118 to collect the data from meters 114.

Figure 2:
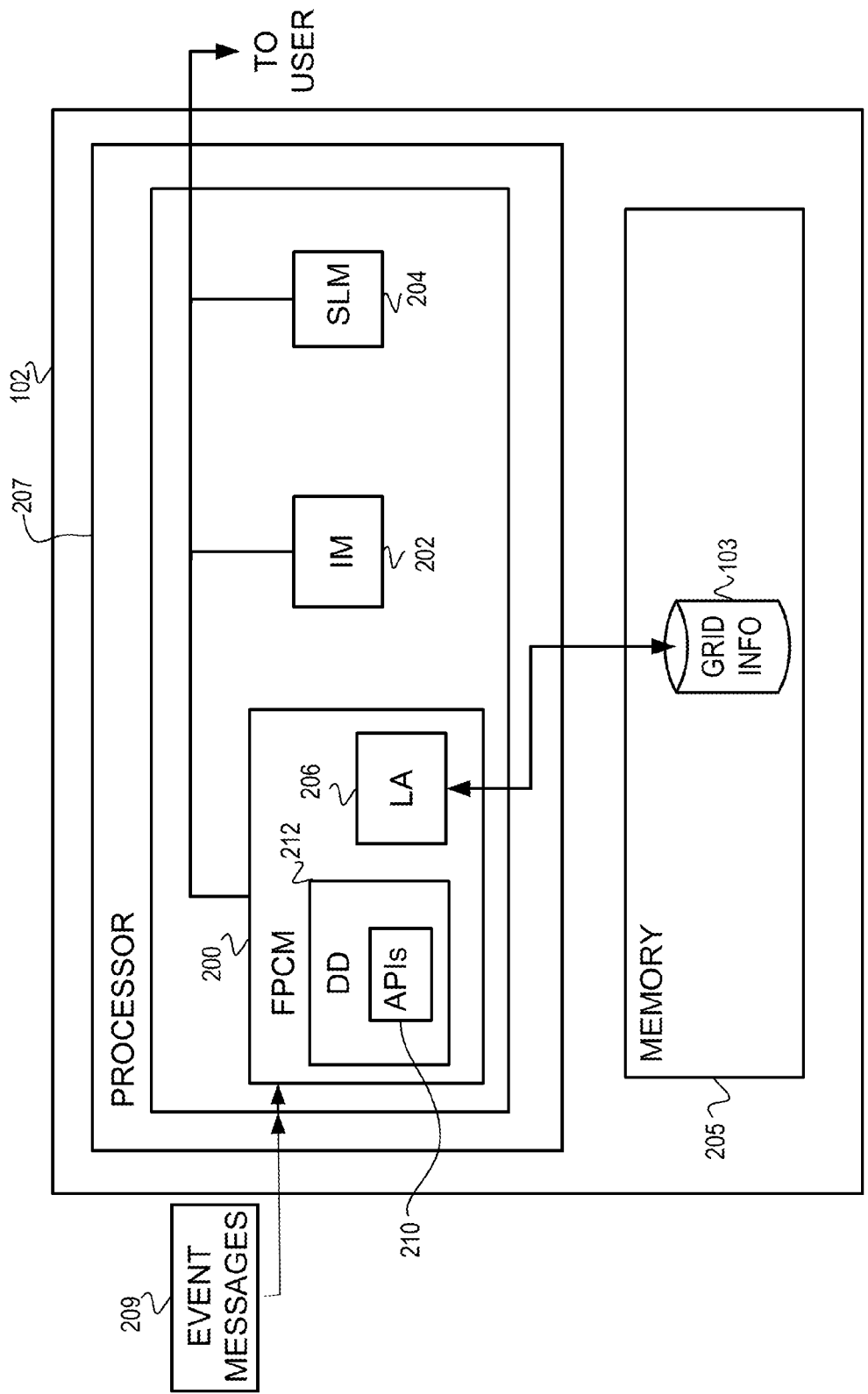
FIG. 2 is a block diagram of an example network operations and management system.

The NOMS 102 may be implemented to deal with communication challenges from the end devices 110 to the control center 108. As shown in FIG. 2, the NOMS 102 may include: 1) a fault, performance, and configuration management (FPCM) module 200; 2) an incident management (IM) module 202; and 3) a service level management (SLM) module 204. The NOMS 102 may be implemented on a computer device having a memory 205 and a processor 207. The various modules of the NOMS may be operated at one or more terminals by a user. Information provided by the various modules may be displayed on various types of displays such as LCDs, LEDs, plasma, CRT, etc.

The FPCM module 200 may identify root-cause problems of equipment within the Smart Grid 100. The root-cause problems may be identified by communicating directly with each device along a communication path and determining the problem based on the response pattern. For example, the NOMS 102 may be notified that various communication devices are reporting an error, such as meters, collectors, etc., through event messages 209. The NOMS 102 may communicate directly with some or all devices along a communication path between the end devices 110 and the control center 108. Based on the event messages and the response pattern of the various network devices, the FPCM module 200 may determine a root cause of the errors.

A number of response pattern rules may be accessed, such as from the grid information database 103, which includes one or more rules that determine causes of failure based on predetermined response patterns. In one example, the one or more rules may be generalized for any utility grid. In another example, the one or more rules may be customized for a particular customer based on the specific topology of the intelligent power grid of that customer. In yet another example, the one or more rules may come from a combination of generalized and customized rules. The rules may be part of an analytical engine, which receives one or more event messages and determines which rule or rules in the analytical engine to implement based on the received one or more event messages. Examples of the applications of such rules are illustrated in FIGS. 4 and 5. The rules may be updated if an identified cause turns out to be incorrect or to be only partially correct, so that the FPCM module 200 thereby becomes trained over time with these specific rules. The FPCM module 200 may also perform service impact and customer impact analyses based on the identified errors, as well as track and push configuration to the various network devices. One example of the FPCM module 200 is Ionix by EMC of Hopkington, Mass.

In one example, the FPCM module 200 may include a library access (LA) module 206 that may allow the FPCM 200 to obtain various informational aspects regarding the Smart Grid 100 during a root-cause analysis in the gird informational database 103 stored in the memory 205. Upon receipt of an event report, the FPCM 200 may determine which devices are reporting such an error. The FPCM 200 may include a device discovery (DD) module 212 that includes a number of application program interfaces (APIs) 210 allowing the FPCM 200 to communicate directly with the network devices, such as the meters 114, collectors 118, databases, routers, servers, and the like included in the network 115 and/or 120.

The IM module 202 may provide trouble ticketing that supports escalation and workflow and problem management. For example, when multiple error reports are generated, based on the root-cause findings of the FPCM module 200, the IM module 202 may only generate a single trouble ticket due to only a single root-cause being responsible for network issues. The IM module 202 may also provide a configuration management database data model that supports information technology infrastructure libraries ("ITIL") functions such as "change management." The IM module 202 may also provide asset management and knowledge management functions. In one example, the IM module 202 may be implemented with the Remedy IT Service Management suite by BMC of Houston, Tex.

The SLM module 204 may be used for penalty reporting that ensures accounting of owned service credits beyond contractual usage levels. The SLM module 204 may also monitor actual performance of the Smart Grid 100 in providing power against contractual service level obligations. In one example, the SLM module 204 may use Service Level Management solutions by Computer Associates of Islandia, N.Y.

Figure 3:
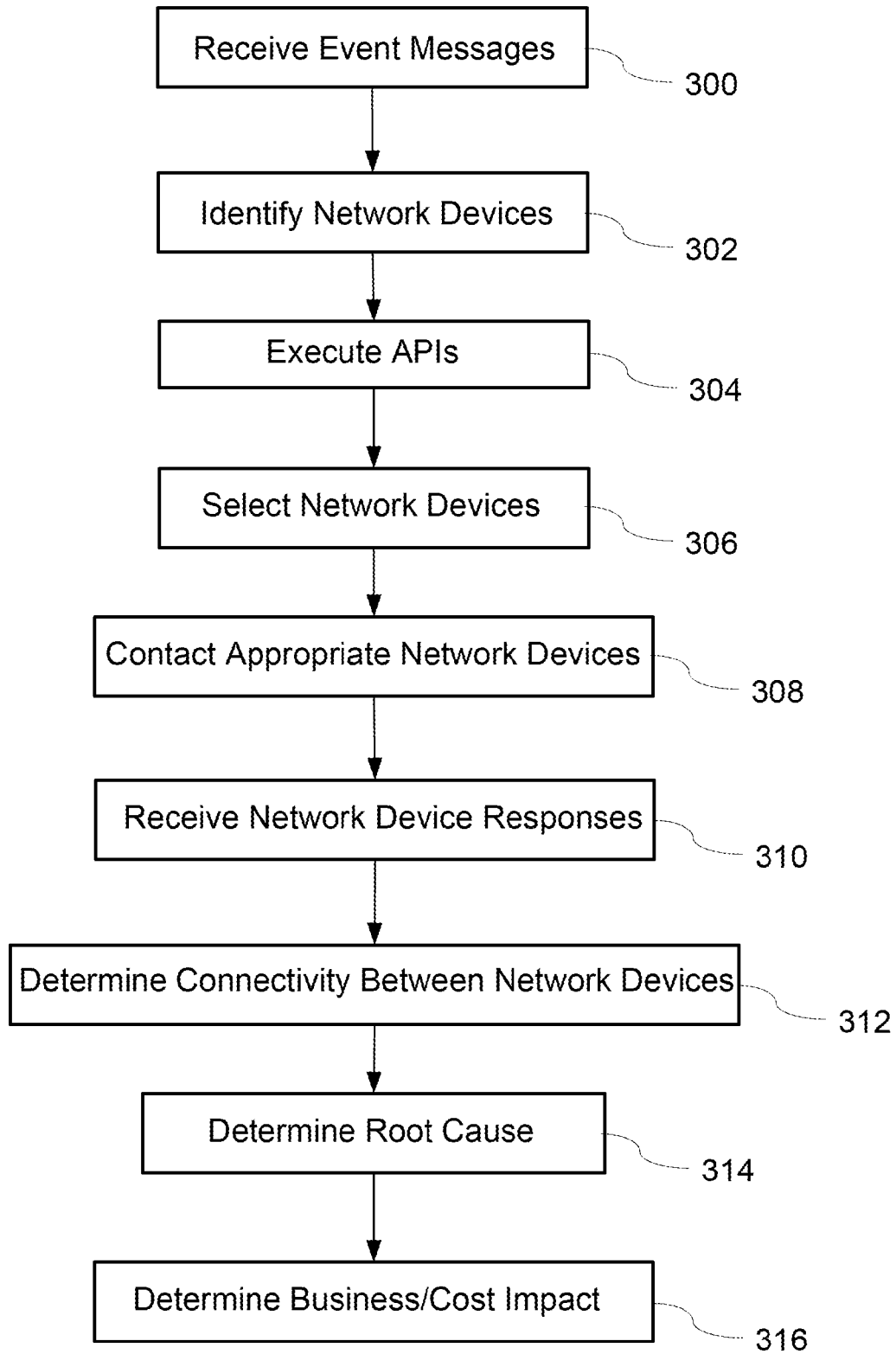
FIG. 3 is an example operational flow diagram of the network operations and management system.

FIG. 3 is an operational flow diagram for an example use of the NOMS 102. An event may occur causing one or more event messages to be received by the NOMS 100 (300). The NOMS 102 may implement the FPCM module 200 to analyze the events. In one embodiment, the FPCM module 200 may utilize the LA module 206 to identify which network devices are reporting errors (302). Upon recognition of the network devices reporting an event, the FPCM module 200 may execute the appropriate APIs using the DD module 212 in order to communicate directly with each network device over the network (304). Using the LA module 206, the FPMS module 200 may select the network devices that should be contacted in order to properly analyze the event reports or messages (306). Upon such recognition, the FPCM 200 may contact the appropriate network devices (308). The NOMS 102 may receive the network device responses, which may include no response (310), for instance. The FPCM 200 may also determine connectivity between devices to ensure that the sub-networks (e.g., LANs 115 and WAN 120) are functioning properly (312). The connectivity may be determined with one or more connectivity tests. Based on the response pattern, the FPCM 200 may determine the root cause of the event reports (314). Upon determination of the root cause, the FPCM 200 may determine a business and customer impact of the root cause (316). The FPCM 200 may perform one or more self-tests directed to one or more network devices determined to cause a failure in the intelligent grid to confirm the root cause.

FIG. 4 is a table 400 illustrating an example of the operation of the fault, performance, and configuration management module (FPCM) 200. The table 400 is based on a scenario in which a collector 118, receiving meter data from a number of meters 114, transmits an event message to the FPCM 200. The FPCM 200 may also receive event messages from the head end 122 when not receiving data from the collector 118. The FPCM 200 may also receive event messages from an enterprise application 123 when not receiving meter data from the head end 122.

In the example of FIG. 4, the steps of the operation of the FPCM 200 are numbered for reference purposes. The step order is for exemplary purposes only and additional or fewer steps may be implemented as well. At step 1, the FPCM 200 may establish a relationship in which the events reported are correlated to determine where in the Smart Grid 100 the network issues have arisen. At steps 2-7, the FPCM 200 may perform a root-cause analysis ("RCA"). The root-cause analysis may involve the FPCM testing network devices such as the relevant meters 114, collectors 118, head end 122, and enterprise applications 123. The FPCM 200 may also check the connectivity between the various devices to ensure that the connecting networks (LANs 115 and WAN 118) are functioning. In the example of FIG. 4, the only root-cause analysis operation showing a failure is the availability of the collector 118. Thus, the FPCM 200 may determine that the collector 118 is not functioning properly. In such a case, a single trouble ticket may be issued using the IM module 202 consolidating what may have otherwise resulted in the multiple trouble tickets to be issued for each of the devices generating event messages. Consolidation allows fewer resources to be expended in diagnosing and correcting network problems.

Furthermore, the steps of the process of identifying a root cause may be iterative in the sense that after analyzing the grid to determine a root cause of any failure, a utility or power grid owner fixes the determine root cause to restore full communication capability with reference to the root cause, and determines yet another root cause for which a residual connectivity or communication issue remains. This can happen where another issue or failure in the grid is masked by the primary or original root cause of the failure, which when fixed, exposes a secondary or additional cause of additional failure or connectivity issues. With implementation of the present disclosure, however, the need for iteration—and certainly the need for simultaneous issuance of multiple trouble tickets—may be significantly reduced.

FIG. 5 is another table 500 illustrating an example of the operation of the fault, performance, and configuration management module (FPCM) 200. The table 500 is based on a scenario in which a cellular tower located in the WAN 120 generates an event message indicating a malfunction. Similarly, a collector 118 generates an event message to indicate that it is unable to forward meter data. The head end 122 also generates an event message indicating that it cannot receive meter data from the collector 118. The enterprise applications may also generate an event message to indicate that meter data is not being received by the head end 122.

In the example of FIG. 5, the steps of the operation of the FPCM 200 are numbered for reference purposes. The step order is for illustration purposes only and additional or fewer steps may be implemented as well. At step 1, the FPCM 200 may establish a relationship in which the events reported are correlated to determine where in the Smart Grid 100 the network issues have arisen. At steps 2-7, the FPCM 200 may perform a root-cause analysis ("RCA"). The root-cause analysis may involve the FPCM testing network devices such as the relevant meters 114, collectors 118, head end 122, and enterprise applications. The FPCM 200 may also check the connectivity between the various devices to ensure that the connecting networks (LANs 115 and WANs 120). Only the connectivity between the meter 114 and collector 118 is shown to be in a state of failure indicating a failure in the LAN 115, which in one example may include three cellular towers and three network routers. In steps 8-13, the FPCM 200 may ping each cellular tower and router, and based on the responses in Table 5, only cellular tower 2 is in a state of failure. Thus, the FPCM 200 has identified the root-cause. In such a case, a single trouble ticket may be issued using the IM module 202 consolidating what may have otherwise resulted in the multiple trouble tickets to be issued for each of the devices generating event messages. Consolidation allows fewer resources to be expended in diagnosing and correcting network problems.

Optimal use of analytics that may be performed by the integrated network operations and management system (NOMS) 102 within a Smart Grid 100 can help utilities improve customer relationships through more regular and targeted demand response programs, boosting customer loyalty, and minimizing wasted marketing expenditures. The NOMS 102 may also enhance environmental performance and compliance by enabling more effective tracking of power supply and demand, and incorporation of renewable energy sources into the grid. The NOMS 102 may further achieve greater network reliability and resilience with real-time, automated updates about grid/equipment status and operations. Faults and outages can be isolated and addressed more quickly and effectively. This improved responsiveness, in turn, helps to build enhanced and durable customer relationships.

Figure 6:
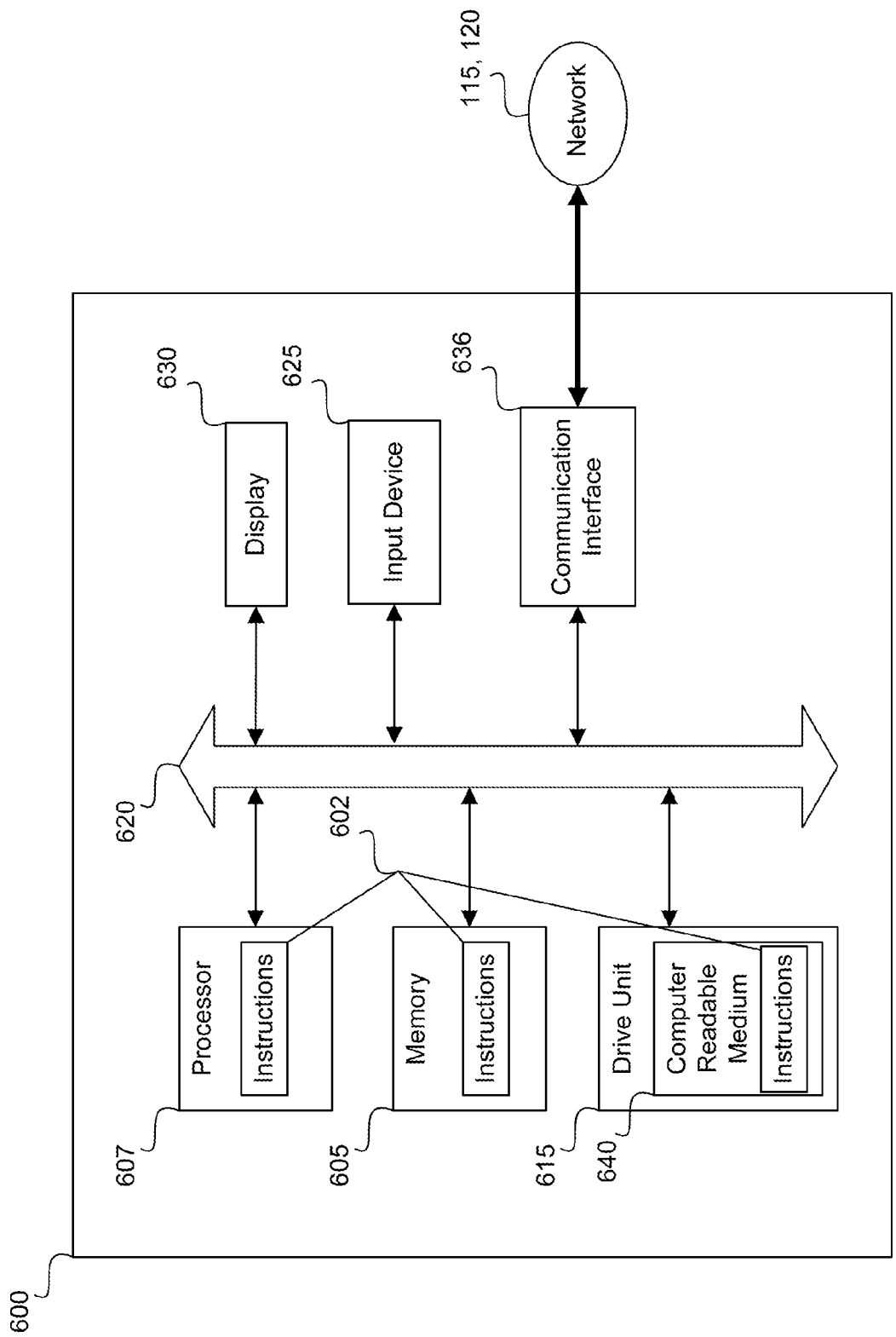
FIG. 6 is a general computer system, which may represent any of the computing or control devices referenced herein.

FIG. 6 is a general computer system 600, which may represent any of the computing devices referenced herein. For instance, the general computer system 600 may represent—in part or in its entirety—the control center 108, the head end 122, the integrated network operations and management system (NOMS) 102, the fault, performance, and configuration management (FPCM) module 200, or any other computing devices referenced herein such as the end devices 110, the meters 114, the telemetry interface units (TIUs) 116, the collectors 118, and/or any networked components such as routers, switches or servers as discussed herein. The computer system 600 may include an ordered listing of a set of instructions 602 that may be executed to cause the computer system 600 to perform any one or more of the methods or computer-based functions disclosed herein. The computer system 600 may operate as a stand-alone device or may be connected, e.g., using the network 115, 120, to other computer systems or peripheral devices.

In a networked deployment, the computer system 600 may operate in the capacity of a server or as a client-user computer in a server-client user network environment, or as a peer computer system in a peer-to-peer (or distributed) network environment. The computer system 600 may also be implemented as or incorporated into various devices, such as a personal computer or a mobile computing device capable of executing a set of instructions 602 that specify actions to be taken by that machine, including and not limited to, accessing the network 115, 120 through any form of browser. Further, each of the systems described may include any collection of sub-systems that individually or jointly execute a set, or multiple sets, of instructions to perform one or more computer functions.

The computer system 600 may include a processor 607, such as a central processing unit (CPU) and/or a graphics processing unit (GPU). The processor 607 may include one or more general processors, digital signal processors, application specific integrated circuits, field programmable gate arrays, digital circuits, optical circuits, analog circuits, combinations thereof, or other now known or later-developed devices for analyzing and processing data. The processor 607 may implement the set of instructions 602 or other software program, such as manually-programmed or computer-generated code for implementing logical functions. The logical function or any system element described may, among other functions, process and/or convert an analog data source such as an analog electrical, audio, or video signal, or a combination thereof, to a digital data source for audio-visual purposes or other digital processing purposes such as for compatibility with computer processing or networked communication.

The computer system 600 may include a memory 605 on a bus 620 for communicating information. Code operable to cause the computer system to perform any of the acts or operations described herein may be stored in the memory 605. The memory 605 may be a random-access memory, read-only memory, programmable memory, hard disk drive or any other type of volatile or non-volatile memory or storage device.

The computer system 600 may also include a disk, solid-state drive optical drive unit 615. The disk drive unit 615 may include a non-transitory or tangible computer-readable medium 640 in which one or more sets of instructions 602, e.g., software, can be embedded. Further, the instructions 602 may perform one or more of the operations as described herein. The instructions 602 may reside completely, or at least partially, within the memory 605 and/or within the processor 607 during execution by the computer system 600. The database 103 or any other databases described above may be stored in the memory 605 and/or the disk unit 615.

The memory 605 and the processor 607 also may include computer-readable media as discussed above. A "computer-readable medium," "computer-readable storage medium," "machine readable medium," "propagated-signal medium," and/or "signal-bearing medium" may include any device that includes, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium.

Additionally, the computer system 600 may include an input device 625, such as a keyboard or mouse, configured for a user to interact with any of the components of system 600, including user selections or menu entries of display menus. It may further include a display 630, such as a liquid crystal display (LCD), a cathode ray tube (CRT), or any other display suitable for conveying information. The display 630 may act as an interface for the user to see the functioning of the processor 607, or specifically as an interface with the software stored in the memory 605 or the drive unit 615.

The computer system 600 may include a communication interface 636 that enables communications via the communications network 120. The network 120 may include wired networks, wireless networks, or combinations thereof. The communication interface 636 network may enable communications via any number of communication standards, such as Ethernet AVB, 802.11, 802.17, 802.20, WiMax, or other communication standards.

Accordingly, the system may be realized in hardware, software, or a combination of hardware and software. The system may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein. Such a programmed computer may be considered a special-purpose computer.

As described herein, any modules or processing boxes are defined to include software, hardware or some combination thereof executable by the processor 607. Software modules may include instructions stored in the memory 605, or other memory device, that are executable by the processor 607 or other processors. Hardware modules may include various devices, components, circuits, gates, circuit boards, and the like that are executable, directed, and/or controlled for performance by the processor 607.

The system may also be embedded in a computer program product, which includes all the features enabling the implementation of the operations described herein and which, when loaded in a computer system, is able to carry out these operations. Computer program in the present context means any expression, in any language, code or notation, of a set of instructions intended to cause a system having an information processing capability to perform a particular function, either directly or after either or both of the following: a) conversion to another language, code or notation; b) reproduction in a different material form.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

The invention claimed is:

1. A system for communication network management of a utility grid, where the utility grid comprises electrical equipment monitored by network devices that are communicable via a communication network of the utility grid, the system comprising:
    a database configured to store a grid information data set, where the grid information data set includes network device information for the utility grid;
    an integrated network operations and management system executable by a processor to:
        receive an event message transmitted by a network device from the network devices, the event message indicative of a communication failure in the communication network of the utility grid;
        retrieve the grid information data set;
        identify one or more network devices associated with the communication failure based on the grid information data set, the one or more network devices being in communication with the network device that transmitted the event message;
        transmit a request for a response to the identified one or more network devices; and
        determine a response pattern based on responses from the identified one or more network devices; and
    a fault, performance, and configuration management (FPCM) module executable by the processor to communicate directly with at least one of the identified network devices, and to determine a cause of the communication failure based on the response patterns and event messages from respective network devices.

2. The system of claim 1, where the system for communication network management is further executable to:
    test connectivity between the identified network devices; and
    identify a cause of the communication failure based on the connectivity test.

3. The system of claim 1, where the system for communication network management is further executable to:
    determine a network device corresponding to the event message; and
    identify the cause of the communication failure as a malfunction in the network device.

4. The system of claim 1, where the event message comprises a plurality of event messages, the system further comprising:
    an incident management module executable by the processor to generate a single trouble ticket associated with a single network device, in response to a plurality of causes of failure identified for the communication failure.

5. The system of claim 1, further comprising:
    a service level management module executable by the processor to report penalties that ensure accounting of owned service credits beyond contractual usage levels and to provide power against contractual service level obligations.

6. The system of claim 1, where the system for communication network management is further executable to:
    identify a different network device based on the response pattern;
    transmit a request for a response to the different network device; and
    identify the cause of the communication failure based on the response from the different network device.

7. The system of claim 1, where the cause of the communication failure is determined based on a comparison of the response pattern with a predetermined response pattern stored in the database.

8. A method for managing a communication network of a utility grid, the method executable by a computer coupled with a processor and memory of an integrated network operations and management system, the method comprising:
    facilitating, by the processor, direct communication with a plurality of network devices via the communication network of the utility grid that facilitates direct communication with respective network devices, the network devices configured to monitor electrical equipment included in the utility grid;
    receiving, with the processor, an event message from a network device, the event message indicative of a communication failure in the communication network of the utility grid;
    retrieving, with the processor, a grid information data set from a database, where the grid information data set includes network device information for the utility grid;
    identifying, with the processor, one or more network devices associated with the communication failure based on the grid information data set, at least some of the one or more network devices being in communication with the network device;
    transmitting, with the processor, a request for a response, the request transmitted to at least some of the identified one or more network devices;
    determining, with the processor, a response pattern based on responses from at least some of the identified one or more network devices; and
    identifying a cause of the communication failure based on the response pattern matching a predetermined response pattern.

9. The method of claim 8, where the event message comprises a plurality of event messages, the method further comprising:
    identifying the cause of the communication failure based on the response pattern and contents of the event messages.

10. The method of claim 8 further comprising:
    testing, with the processor, connectivity between at least some of the identified network devices; and
    identifying, with the processor, a cause of the communication failure based on the testing.

11. The method of claim 10 further comprising:
    identifying, with the processor, a different network device based on the response pattern;
    transmitting, with the processor, a request for a response to the different network device; and
    identifying, with the processor, the cause of the communication failure based on the response from the different network device.

12. The method of claim 11, where identifying, with the processor, a different network device comprises identifying, with the processor, the different network device that is a part of a local area network.

13. The method of claim 11, where identifying, with the processor, a different network device comprises identifying, with the processor, the different network device that is a part of a wide area network.

14. The method of claim 8 further comprising:
    determining, with the processor, a network device that transmitted the event message; and
    identifying, with the processor, the cause of the communication failure as a malfunction in the network device.

15. A non-transitory computer-readable medium having a plurality of instructions executable by a processor to manage a communication network of a utility grid by an integrated network operations and management system that includes a database configured to store a grid information data set including network device information for the utility grid, the computer-readable medium comprising:
    instructions to execute direct communication with a plurality of network devices of the communication network;
    instructions to receive an event message transmitted by a network device, the event message indicative of a connectivity failure in the communication network of the utility grid, where the utility grid comprises electrical equipment to be monitored;
    instructions to retrieve the grid information data set included in the database;
    instructions to identify one or more network devices on a communication path associated with the network device that transmitted the event message, the communication path being a part of the communications network between the electrical equipment and the integrated network operations and management system, and the network devices identified based on the grid information data set;
    instructions to transmit a request for a response to at least some of the identified one or more network devices; and
    instructions to determine a response pattern based on responses from at least some of the identified one or more network devices in order to identify a cause of the connectivity failure based on the response pattern and the event message.

16. The non-transitory computer-readable medium of claim 15 further comprising:
    instructions to test connectivity between at least some of the identified network devices; and
    instructions to identify a cause of the connectivity failure based on the connectivity test.

17. The non-transitory computer-readable medium of claim 15 further comprising:
    instructions to determine a network device corresponding to the event message; and
    instructions to identify the cause of the connectivity failure as a malfunction in the network device.

18. The non-transitory computer-readable medium of claim 15 further comprising:
    instructions to identify a different network device based on the response pattern;
    instructions to transmit a request for a response to the different network device; and
    instructions to identify the cause of the connectivity failure based on the response from the different network device.

19. The non-transitory computer-readable medium of claim 18, where the instructions to identify a different network device comprises instructions to identify the different network device that is a part of a local area network.

20. The non-transitory computer-readable medium of claim 18, where the instructions to identify a different network device comprises instructions to identify the different network device that is a part of a wide area network.

* * * * *